United States Patent
Jansson et al.

(10) Patent No.: US 9,863,370 B2
(45) Date of Patent: Jan. 9, 2018

(54) METHOD OF STARTING GAS DELIVERY FROM A LIQUEFIED GAS FUEL SYSTEM TO A GAS OPERATED ENGINE AND A LIQUEFIED GAS FUEL SYSTEM FOR A GAS OPERATED ENGINE

(71) Applicant: WARSTILA FINLAND OY, Vaasa (FI)

(72) Inventors: Mathias Jansson, Vaasa (FI); Soren Karlsson, Solf (FI)

(73) Assignee: WÄRTSILÄ FINLAND OY, Vaasa (FI)

(*) Notice: Subject to any disclaimer, the term of this patent is extended or adjusted under 35 U.S.C. 154(b) by 149 days.

(21) Appl. No.: 14/651,520

(22) PCT Filed: Dec. 14, 2012

(86) PCT No.: PCT/FI2012/051245
§ 371 (c)(1),
(2) Date: Jun. 11, 2015

(87) PCT Pub. No.: WO2014/091061
PCT Pub. Date: Jun. 19, 2014

(65) Prior Publication Data
US 2015/0315949 A1    Nov. 5, 2015

(51) Int. Cl.
*F02M 21/02* (2006.01)
*F17C 5/02* (2006.01)
(Continued)

(52) U.S. Cl.
CPC .......... *F02M 21/0218* (2013.01); *F01N 5/02* (2013.01); *F17C 5/02* (2013.01); *F17C 5/06* (2013.01);
(Continued)

(58) Field of Classification Search
CPC .......... F02M 21/0218; F02M 21/0221; F02M 21/023; F02M 21/0239; F17C 5/02; F01N 5/02
See application file for complete search history.

(56) References Cited

U.S. PATENT DOCUMENTS

| | | | |
|---|---|---|---|
| 6,125,637 A | 10/2000 | Bingham et al. | |
| 2008/0257301 A1* | 10/2008 | Hotta | C01B 3/26 123/253 |

(Continued)

FOREIGN PATENT DOCUMENTS

| | | |
|---|---|---|
| JP | 2009-079600 A | 4/2009 |
| JP | 2011-503463 A | 1/2011 |

(Continued)

OTHER PUBLICATIONS

International Search Report for PCT/FI2012/051245 dated Aug. 13, 2013.

(Continued)

*Primary Examiner* — Kevin A Lathers
(74) *Attorney, Agent, or Firm* — Heslin Rothenberg Farley & Mesiti P.C.; Victor A. Cardona, Esq.

(57) ABSTRACT

A method for starting gas delivery from a liquefied gas fuel system includes a fuel tank filled with liquefied gas by a filling procedure and the filling procedure resulting in the pressure in the tank being at least at an operational pressure required by the engine. The method pressure in the tank is controlled by controlling the operation of a pressure build up system including the pressure build up evaporator which is arranged in a conduit leading from the bottom section of the tank to the upper section of the tank. The pressure build up system is controlled by controlling the flow rate of the (Continued)

evaporated gas in the conduit while the heat transfer medium is allowed to flow unconstrained through the pressure build up evaporator.

16 Claims, 3 Drawing Sheets

(51) Int. Cl.
*F17C 5/06* (2006.01)
*F17C 6/00* (2006.01)
*F17C 9/00* (2006.01)
*F17C 13/02* (2006.01)
*F01N 5/02* (2006.01)
*F02M 21/06* (2006.01)

(52) U.S. Cl.
CPC .................. *F17C 6/00* (2013.01); *F17C 9/00* (2013.01); *F17C 13/021* (2013.01); *F17C 13/025* (2013.01); *F17C 13/026* (2013.01); *F02M 21/0212* (2013.01); *F02M 21/0239* (2013.01); *F02M 21/06* (2013.01); *F17C 2205/0326* (2013.01); *F17C 2221/033* (2013.01); *F17C 2223/0161* (2013.01); *F17C 2223/033* (2013.01); *F17C 2223/035* (2013.01); *F17C 2223/046* (2013.01); *F17C 2225/0123* (2013.01); *F17C 2225/0161* (2013.01); *F17C 2225/033* (2013.01); *F17C 2225/035* (2013.01); *F17C 2225/043* (2013.01); *F17C 2225/044* (2013.01); *F17C 2225/047* (2013.01); *F17C 2227/0107* (2013.01); *F17C 2227/0323* (2013.01); *F17C 2227/0393* (2013.01); *F17C 2250/032* (2013.01); *F17C 2250/043* (2013.01); *F17C 2250/0408* (2013.01); *F17C 2250/0439* (2013.01); *F17C 2250/0473* (2013.01); *F17C 2250/0491* (2013.01); *F17C 2250/0626* (2013.01); *F17C 2250/0636* (2013.01); *F17C 2260/046* (2013.01); *F17C 2265/05* (2013.01); *F17C 2265/065* (2013.01); *F17C 2265/066* (2013.01); *F17C 2270/0105* (2013.01); *Y02T 10/16* (2013.01); *Y02T 10/32* (2013.01)

(56) References Cited

U.S. PATENT DOCUMENTS

| | | | |
|---|---|---|---|
| 2009/0113913 A1* | 5/2009 | Esaki | B60H 1/323 62/239 |
| 2011/0179810 A1* | 7/2011 | Sipila | B63B 27/24 62/53.2 |
| 2011/0314839 A1* | 12/2011 | Brook | F02M 21/06 62/49.1 |

FOREIGN PATENT DOCUMENTS

| | | |
|---|---|---|
| WO | 2010/096903 A1 | 10/2010 |
| WO | 2011/053164 A1 | 5/2011 |

OTHER PUBLICATIONS

English translation of Apr. 19, 2016 Office Action from corresponding Japanese Patent Application No. 2015-547098.

* cited by examiner

METHOD OF STARTING GAS DELIVERY FROM A LIQUEFIED GAS FUEL SYSTEM TO A GAS OPERATED ENGINE AND A LIQUEFIED GAS FUEL SYSTEM FOR A GAS OPERATED ENGINE

CROSS REFERENCE TO RELATED APPLICATIONS

This application is a national stage filing under section 371 of International Application No. PCT/FI2012/051245 filed on Dec. 14, 2012, and published in English on Jun. 19, 2014, as WO 2014/091061 A1, the entire disclosure of this application being hereby incorporated herein by reference.

TECHNICAL FIELD

The invention relates to of starting gas delivery from a liquefied gas fuel system to gas operated engine.

The invention relates to a liquefied gas fuel system for a gas operated engine.

BACKGROUND ART

Gas is becoming more and more attractive fuel for ships' and other marine vessels' prime movers and auxiliary engines. Particularly but not exclusively natural gas (NG) is feasible due to its availability. Natural gas is a gaseous mixture in the ambient circumstances consisting primarily of methane and small amounts of ethane, propane, butane and nitrogen. It has high hydrogen content relative to coal, so when combusted it provides inter alia low amount of emissions, very clean burns process and it is basically free of contaminants. Particularly in cruise vessels, ferries and so called ropax vessels, where passengers are on board, the absence of soot emissions and visible smoke in the exhaust gases of ship's engines is very important feature facilitated by using NG as fuel for the engines but also for vessels carrying goods and bulk materials. Usually natural gas is stored as liquefied natural gas (LNG) at temperature of about −162° C., thus the storage cause problems particularly when the LNG is stored at high pressure, about at 5 bar, which is typically the level that a gas operated piston engine requires.

When bunkering i.e. a fuel bunker of a LNG fuelled vessel the pressure inside the vessel's LNG tank is usually needs to be lowered to facilitate the flow of liquefied gas from a storage tank to the vessel's LNG tank in order to have a minimal/low enough counter pressure in the vessel's tank compared to the pressure in the storage tank i.e. LNG bunker tank. The lowering of the pressure may be accomplished by spraying cold LNG from the top of the tank which cools down the gas in the gaseous phase decreasing the pressure.

However, after bunkering the pressure must be again rebuilt in order to have a sufficient gas pressure for feeding the gas to the engines of the vessel at appropriate pressure. In the prior art systems the pressure is rebuilt by heating up the LNG and returning the gas at the top of the tank by means of a so called pressure build up circuit.

If the engines of the vessel are not running or are only idling there is only a limited heat available after bunkering. This means that the pressure build up takes a long time.

In WO2011053164A1 there is shown an LNG fuel tank system for at least cure gas engine used for ship propulsion, comprising at least one LNG fuel tank and a gas vessel, the LNG fuel tank to be bunkered from an onshore LNG pressure tank filling facility by means of a LNG filling line, wherein the LNG fuel tank is a ship low pressure controlled atmospheric pressure LNG tank, and the gas vessel is a single shell non-insulated pressure vessel arranged to accumulate flashed and boil-off gas during LNG bunkering and pressure relieving the LNG fuel tank, respectively. The gas engines are fuelled from either the gas vessel or the LNG fuel tank, dependent on a predefined gas vessel pressure. Thus, the publication suggests accumulating flashed and boil-off gas during LNG bunkering while maintaining the pressure in the LNG fuel tank low by means of a compressor connected between the LNG fuel tank, and the gas vessel. Fuelling the gas engine of the vessel is taken place so that gas from the gas vessel is used until the pressure approaches about 5-6 bar gauge, where after the fuelling is effected from the LNG fuel tank.

Although the fuel system shown in WO2011053164A1 may be advantageous as such, there has recently come out demands to provide other solutions to bunkering LNG fuel tank in a marine vessel particularly in a situation where the LNG tank(s) of the vessel is/are pressure vessel(s).

It is an object of the invention to provide method of starting gas delivery from a liquefied gas fuel system to an engine, and a liquefied gas fuel system for a gas operated engine which provides more simple operation and immediate utilization of the gas as fuel for a gas operated piston engine.

DISCLOSURE OF THE INVENTION

Object of the invention are met substantially as is disclosed in the independent claims. The other claims present more details of different embodiments of the invention.

According to the invention in a method of starting gas delivery from a liquefied gas fuel system to a gas operated engine, a fuel tank is filled with liquefied gas by a filling procedure, fuel system comprising a main evaporator in a fuel conduit leading from the tank to an engine, which main evaporator evaporates the liquefied gas in the fuel tank while the engine is operated by gaseous gas, and the engine is started and operated and is thus producing waste heat, waste heat is utilized in a heat transfer medium circuit, in which heat transfer medium is flowing through a pressure build up evaporator arranged in connection with the tank and the main evaporator being successively in series with the pressure build up evaporator, pressure in the tank is controlled by controlling the operation of a pressure build up system comprising the pressure build up evaporator which is arranged in a conduit leading from the bottom section of the tank to the upper section of the tank. The filling procedure results in that the pressure in the tank is at least at operational pressure the required by the engine and the pressure build up system is controlled by controlling the flow rate of the evaporated gas in the conduit while the heat transfer medium is allowed to flow unconstrained through the pressure build up evaporator.

According to an embodiment of the invention the method during an initial stage of the operation of the engine, when only limited amount of heat is available, the flow rate of the evaporated gas in the pressure build up evaporator is controlled so that the available heat in the heat transfer medium circuit is prioritized for the main evaporator.

According to an embodiment of the invention the flow rate of the evaporated gas is controlled by means of a valve arranged in the conduit.

According to an embodiment of the invention the main evaporator evaporates the liquefied gas making use of the waste heat produced by the engine.

According to an embodiment of the invention in the method during an initial stage of the operation of the engine when only limited amount of heat is available the gas flow rate to the engine and the operation of the engine is controlled to maintain the operational pressure at the engine inlet of the conduit while the available waste heat produced by the engine is used in pressure build up evaporator only to the extent that the pressure of a lowest acceptable level in the tank is maintained.

This way stating and running the engines on gas when the available heat power is small is made possible. Also this ensures that all heat available can and will be used for increasing and maintaining gas pressure.

According to a further embodiment of the invention the fuel tank is filled by a filling procedure with a liquefied gas so that liquefied gas is brought into the tank so that gas in introduced to a lower section of the tank below the surface of the liquefied gas in the tank, and during a first phase of the filling procedure while gas in introduced to a lower section of the tank the pressure of the tank is maintained below a predetermined set pressure by spraying of liquefied gas into a gas space in the upper section of the tank above the surface of the liquefied gas in the tank. In the method at a predetermined state of the filling procedure a second phase of the procedure is initiated during which the spraying liquefied gas into a gas space in the upper section of the tank is decreased and the second phase is practised until a predetermined filling stage of the tank is reached.

According to a further embodiment of the invention liquefied gas fuel system for a gas operated engine, comprises a fuel tank which is in connection with at least one gas operated engine, a fuel line comprising an inlet connector into which an external source of liquefied gas may be temporarily connected, the feed line has at least two branches, the first one of which extends to the tank and has its outlet at vicinity of the bottom of the tank and the second branch extends to the tank having its outlet comprising a plurality of spray nozzles, and a control unit, wherein the control unit is arranged to exercise filling procedure according to the invention.

According to an embodiment of the invention at the end of the second phase the gas pressure is at a level required by a gas utilizing engine connected to the tank.

According to an embodiment of the invention after a predetermined stage of the filling procedure the controlling of the spraying of liquefied gas into a gas space in the upper section of the tank is practised so that a second predetermined set pressure for the control is set which corresponds the required gas feed pressure of the engines in the vessel.

According to an embodiment of the invention a portion of the gas brought into the tank during the first phase of the filling procedure is sprayed into a gas space in the upper section of the tank above the surface of the liquefied gas in the tank.

According to an embodiment of the invention during the first phase the portion of the gas sprayed into a gas space in the upper section of the tank is set to be a constant portion of the gas introduced into the tank.

According to an embodiment of the invention during the first phase the rate of spraying of liquefied gas into a gas space in the upper section of the tank is controlled so that the actual gas pressure in the tank has decreasing tendency until the predetermined state of the filling procedure.

According to an embodiment of the invention during the filling process liquefied gas sprayed into a gas space in the upper section of the tank above the surface of the liquefied gas in the tank is recirculated from the lower section of the tank.

According to an embodiment of the invention the rate of spraying of liquefied gas into a gas space in the upper section of the tank above is controlled based on the difference between the actual gas pressure in the tank and the predetermined set pressure.

According to an embodiment of the invention during the second phase the rate of the spraying liquefied gas into a gas space in the upper section of the tank is totally stopped.

According to an embodiment of the invention in the method the predetermined state is defined so that the duration of the second phase is minimized.

Low counter pressure in the tank allows more rapid bunkering and tank's operating pressure is maintained immediately after bunkering with minimum need of pressure build up system.

According to a further embodiment of the invention a liquefied gas fuel system for a gas operated engine, comprises a fuel tank which is in connection with at least one gas operated engine, a main evaporator in a fuel conduit leading from the fuel tank to the engine, a pressure build up evaporator arranged in a conduit leading from the bottom section of the tank to the upper section of the tank, and a control unit, wherein the control unit is arranged to exercise a method of starting gas delivery according to anyone of the claims 1-16.

BRIEF DESCRIPTION OF DRAWINGS

In the following the invention will be described with the reference to the accompanying schematic drawings, in which.

BEST MODE FOR CARRYING OUT THE INVENTION

Figure 1:
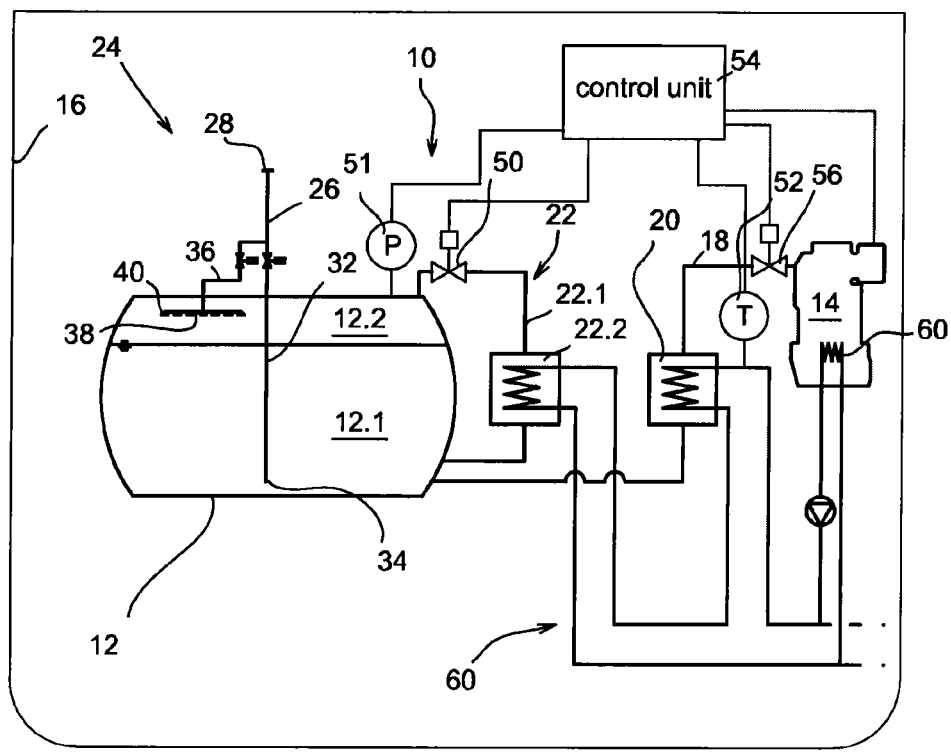
FIG. 1 illustrates an embodiment of the fuel feeding system according to the invention.

FIG. 1 describes an embodiment of the fuel system 10 according to the invention. The fuel system comprises a fuel tank 12 which is in connection with at least one gas operated engine 14 of the vessel 16, so that the engine may be operated making use of the gas stored in the fuel tank. The gas, particularly liquefied natural gas, is stored in the tank 12 at considerably low temperature, typically at temperature of about −162° C. which is described as cryogenic conditions. Typically the gas fills the tank so that a part of the gas is as liquefied gas at the bottom of the tank 12.1 and part as gaseous gas at the upper part 12.2 i.e. gas space of the tank above the liquid portion of the gas. The tank 12 comprises insulation (not shown) to prevent excessive warming up of the LNG in the tank arrangement. The fuel system 10 is filled from time to time and the filling procedure is performed such that after the filling the tank 12 is pressured having an adequate pressure to at least start the engine 14. Such an adequate pressure depends on the demands of the engine, and it may be a nominal operational pressure according to the manufacturer specifications.

In this exemplary embodiment the tank is connected via a fuel conduit 18 with the engine 14. The fuel conduit 18 is provided with an evaporator 20 by means of which liquefied gas may be evaporated prior to feeding to the engine according to the demand. This evaporator is called a main evaporator because during the operation of the engine the gas combusted in the engine is evaporated continuously from the liquefied gas in the tank 12. The tank 12 is also provided with a pressure build up system 22 by means of which the pressure in the tank 12 may be maintained at a level which makes it possible to deliver fuel to the engine at required feed pressure even without mechanical pumping. The pressure build up system 22 comprises a conduit 22.1 leading from the bottom section of the tank to the upper section of the tank 12 and an evaporator 22.2 arranged to the conduit. During the operation of the pressure build up system the liquefied gas is turning into gaseous form in the evaporator and is led to the upper part of the tank. The evaporation increases the pressure in the tank. Pressure is detected by a sensor 56 which is in connection with a control unit 54. There is a valve 50 arranged to the conduit 22.1 by means of which the flow rate of the gas in the conduit may be controlled. The operation of the valve is controlled by a control unit 54 arranged to control the fuel system 10. Evaporation process requires heat in order to carry out the change of phase of the liquefied gas. Even though there usually are several usable heat sources available in a marine vessel, such as steam, thermal oil, electrical heating, the most economical way is to use the waste heat obtained from the engine 14.

The fuel system comprises a heat transfer medium circuit 60, which is arranged in heat transfer communication with the cooling system of the engine 62. The heat transfer medium circuit 60 is also connected to the pressure build up evaporator 22.2 and the main evaporator 20. The connection is advantageously such that the heat transfer medium may flow unconstrained, that is without active control or freely, through the evaporators. The pressure build up evaporator and the main evaporator are connected in series to the circuit. Heat transferred in the pressure build up evaporator 22.2 is controlled by controlling the flow rate of the evaporated gas and the unconstrained flowing heat transfer medium cools down according to the heat required to evaporate the respective amount of gas resulting in the desired flow rate. The heat consumption in the main evaporator 20 is ruled by the flow rate of the evaporated gas and the unconstrained flowing heat transfer medium cools down according to the heat required to evaporate the respective amount of gas resulting in the desired flow rate.

The waste heat obtainable from the engine 14 is naturally a subject to running of the engine and it is also dependent on the engine load. The higher the load, the more heat is available. Normally engines are not running during bunkering. During the bunkering the tank 12 is filled with liquefied gas by a filling procedure and the filling procedure results in that the pressure in the tank 12 is at least at operational pressure the required by the engine. Thus it is possible to start engine with minimum heat to operate the main evaporator 20 only. Now according to an embodiment of the invention of the operation of the engine, particularly during an initial stage of the operation of the engine, when only limited amount of heat is available the flow rate of the evaporated gas in the pressure build up evaporator 22.2 is controlled based on the measured temperature of the heat transfer medium in the heat transfer medium circuit so that the available heat in the heat transfer medium circuit 60 is prioritized for the main evaporator 20. The heat transfer medium circuit is provided with a sensor 52 being in connection with the control unit 54 for that purpose. Thus, preferably the main evaporator 20 evaporates the liquefied gas making use of the waste heat produced by the engine 14.

This way it can be assured, that the engine 14 can be started in gas mode with a minimal need of external heat. The flow rate in the conduit 22.1 is more specifically controlled by means of a valve 50 arranged in the conduit 22.1.

While operating the engine during the initial stage, the valve 50 is controlled to keep the pressure in the tank 14 a lowest level making it possible to operate the engine 14. Therefore the fuel system is provided with a pressure sensor 51 connected to control unit 54. In other words the gas flow rate to the engine through the valve 56 and the operation of the engine 14 is controlled to maintain the operational pressure at the engine inlet of the conduit 18 while the available waste heat produced by the engine is used in pressure build up evaporator 22.2 only to the extent that the pressure of a lowest acceptable level in the tank 12 is maintained.

Figure 2:
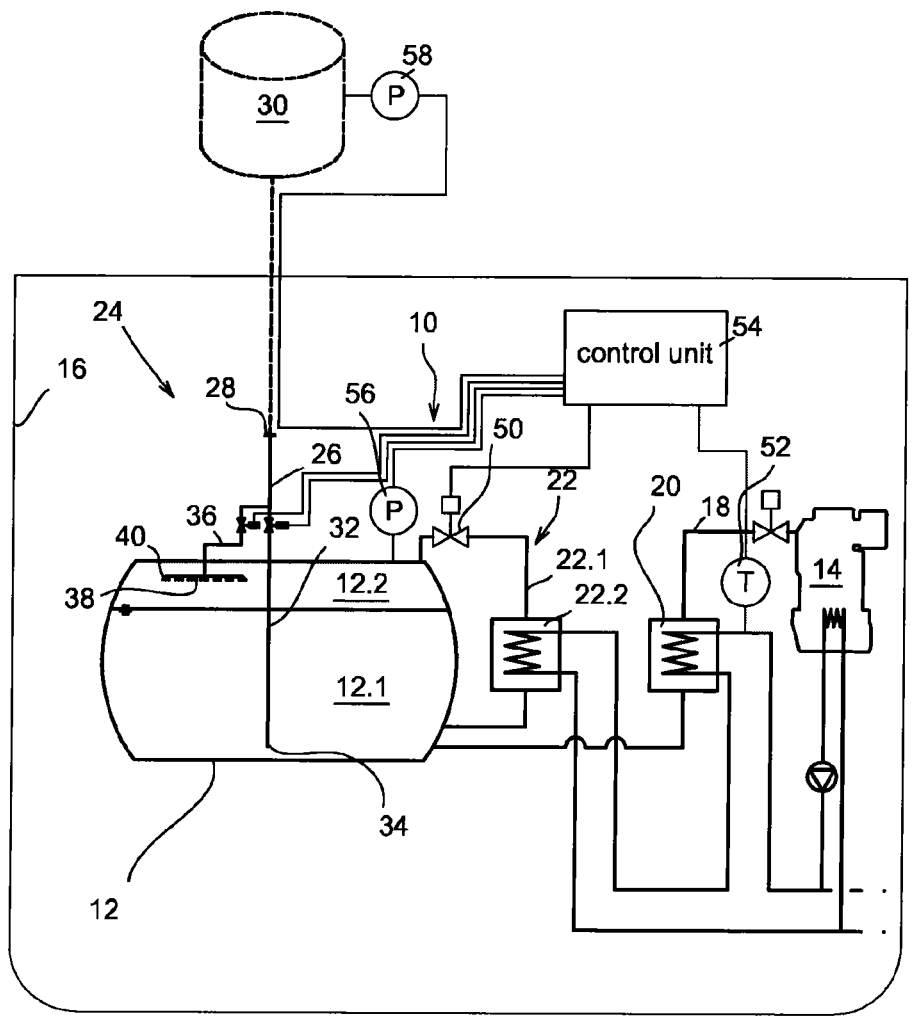
FIG. 2 illustrates another embodiment of the fuel feeding system according to the invention and FIG. 2 illustrates a graph of pressure during the filling procedure according to the invention.

FIG. 2 describes an embodiment of the fuel system according to the invention.

Also in this exemplary embodiment the tank is connected via a fuel conduit 18 with the engine 14 and the fuel conduit is provided with an evaporator 20 by means of which liquefied gas may be evaporated prior to feeding to the engine according to the demand.

Since the engine consumes the gas the tank it must be filled occasionally with liquefied gas. In order to fill the tank, which is called also as bunkering, the tank 12 is provided with a filling system 24. The filling system comprises a feed line 26 with an inlet connector 28 into which an external source 30 of liquefied as may be temporarily connected for bunkering. The feed line has at least two branches, the first one of which extends to the tank 12 and has its outlet 34 at vicinity of the bottom of the tank. Thus first branch 32 of the feed line opens below the surface of the liquefied gas in the tank 12. The second branch 36 extend to the tank 12 as well, but is has its outlet 38 at the vicinity of the top of the tank opening into the space of gaseous gas. The outlet 38 comprises a plurality of spray nozzles 40 which makes the liquid gas atomizing into small when it is introduced into the tank through the nozzles.

When the tank is filled the external source 30 of liquefied gas is connected to the connector 28 any preparatory actions are performed. The pressure in the tank 21 is lowered to a level being lower than the pressure in the source 30 so that liquefied gas may flow into the tank 12. The pressure in the external source may be measured by a sensor 56. During the filling of the tank the delivery of fuel from the tank 12 to the engine 14 is stopped and the engine may be stopped or operated making use of other possible fuel sources.

Now, fuel in liquid state is introduced to the lower section 21.1 of the tank through the first branch 32, below the surface of the liquefied gas in the tank. This causes the surface of the liquid gas rise and the gas pressure in the upper section of the tank 12.2 tends to increase accordingly. Thus during the first phase of the filling procedure, while liquefied gas in introduced to the lower section 12.1 of the tank the pressure in the tank is maintained below a predetermined set pressure by spraying of liquefied gas into a gas space 12.2 in the upper section of the tank above the surface of the liquefied gas in the tank by means of the second branch 36 of the fuel feed line 26. Spraying of the liquid gas results in quick evaporation of the gas and requiring heat, the evaporation lowers the temperature, and thus also pressure of the gas accordingly.

According to the invention at a predetermined state of the filling procedure a second phase of the procedure is initiated during which the spraying liquefied gas into a gas space 12.2 in the upper section of the tank is decreased or stopped. This has an effect of causing the pressure increase in the tank.

The second phase of the filling procedure terminates to a predetermined filling state of the tank, such as being filled full. Advantageously, the second phase ends to the end of the whole filling procedure. Also, at the end of the second phase the gas pressure is at a level required by a gas utilizing engine connected to the tank.

The predetermined state of the filling procedure may be a predetermined filling level of the tank, a predetermined elapsed time of the filling or even an estimation of remaining time or remaining fuel amount to filling the tank full.

According to en embodiment of the invention after the predetermined stage (FIG. 3, C) of the filling procedure spraying of liquefied gas into a gas space 12.2 in the upper section of the tank is practised so that a second predetermined set pressure is set which corresponds to required gas feed pressure of the engines 14 in the vessel and the spraying rate of the gas is controlled by a control unit. The spraying into the gas space 12.2 comprises a desired portion of the total fuel flow into the tank. Advantageously the spraying is controlled by on/off manner operating a valve in the second branch 36. It is also possible to introduce all fuel through the nozzles 40.

During the first phase of the filling procedure the pressure in the tank is controlled so that a portion of the gas brought into the tank is sprayed into a gas space in the upper section of the tank above the surface of the liquefied gas in the tank so that the pressure in the tank is maintained below the predetermined set pressure.

Even if not shown in the FIG. 2 it is conceivable in certain cases the liquefied gas sprayed into a gas space in the upper section of the tank above the surface of the liquefied gas in the tank is recirculated from the lower section of the tank.

According to an embodiment the portion of the gas sprayed into a gas space in the upper section of the tank is set to be a constant portion of the gas introduced into the tank of the valve in the second branch 36 is set to constant position during the second phase of the filling procedure. This way the control is simple and setting the position suitable provides a high enough flow rate of the sprayed liquefied gas to maintain or even decreasing the pressure while introducing liquefied gas to the lower section 12.1 of the tank 12.

When practising active control of the filling the rate of spraying of liquefied gas into a gas space in the upper section of the tank above is controlled so that the actual gas pressure in the tank has decreasing tendency until the predetermined state of the filling procedure.

According to an embodiment of the invention the rate of spraying of liquefied gas into a gas space in the upper section of the tank above is controlled based on the difference between the actual gas pressure in the tank and the predetermined set pressure.

Figure 3:
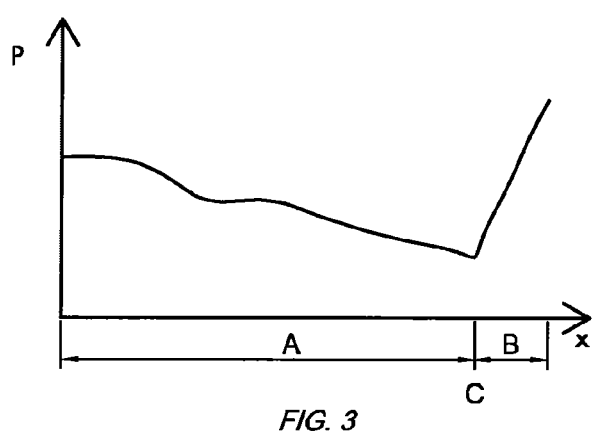

In FIG. 3 there is illustrated as a graph of pressure (vertical axis) in the tank as function of time or filling state of the tank (horizontal axis). During the first phase A of the filling procedure the pressure in the tank has decreasing tendency while the filling proceeds. Beginning at a predetermined state of the filling procedure C, the pressure is caused to rise considerably rapidly by decreasing or stopping the spraying liquefied gas into a gas space in the upper section of the tank. After the predetermined state C the second phase of the filling procedure B is practised during which the pressure is increased considerably until a predetermined filling stage of the tank is reached.

It is to be noted that only a few most advantageous embodiments of the invention have been described in the above. Thus, it is clear that the invention is not limited to the above-described embodiments, but may be applied in many ways within the scope of the appended claims. The features disclosed in connection with various embodiments can also be used in connection with other embodiments within the inventive scope and/or different assemblies can be combined from the disclosed features, should it be desired and should it be technically feasible.

The invention claimed is:

1. A method for starting gas delivery from a liquefied gas fuel system to a gas operated engine in which method a fuel tank is filled with liquefied gas, the method comprising:
   the fuel system comprising a main evaporator in a fuel conduit leading from the fuel tank to an engine, the main evaporator arranged in connection with the fuel tank and evaporating the liquefied gas in the fuel tank while the engine is operated by gaseous gas, and
   the engine started and operated and producing waste heat,
   the waste heat produced by the engine utilized in a heat transfer medium circuit, in which heat transfer medium is flowing through the main evaporator,
   pressure in the fuel tank controlled by controlling the operation of a pressure build up system which is arranged in a conduit leading from the bottom section of the fuel tank to the upper section of the fuel tank, wherein
   the heat transfer medium by means of which the waste heat produced by the engine is utilized, flowing through a pressure build up evaporator and the main evaporator being successively connected in series,
   the filling of the fuel tank resulting in that the pressure in the tank is at least at an operational pressure required by the engine, and after the filling procedure the pressure build up evaporator controlled by controlling a flow rate of the evaporated gas in the conduit while the heat transfer medium is allowed to flow unconstrained through the pressure build up evaporator and the main evaporator.

2. Method according to claim 1, wherein during an initial stage of the operation of the engine, when only limited amount of waste heat produced by the engine is available, the flow rate of the evaporated gas from the pressure build up evaporator is controlled so that the available heat in the heat transfer medium circuit is prioritized for the main evaporator.

3. Method according to claim 1, wherein the flow rate of the evaporated gas is controlled by means of a valve arranged in the conduit.

4. Method according to claim 1, wherein the main evaporator evaporates the liquefied gas making use of the waste heat produced by the engine.

5. Method according to claim 4, wherein in the method during an initial stage of the operation of the engine when only limited amount of heat is available the gas flow rate to the engine and the operation of the engine is controlled to maintain the operational pressure at the engine inlet of the conduit while the available waste heat produced by the engine is used in pressure build up evaporator only to the extent that the pressure of a lowest acceptable level in the tank is maintained.

6. Method according to claim 1, wherein the tank is filled by a filling procedure of the tank which is practiced so that liquefied gas is brought into the tank via a first branch of a fuel feed pipe, so that gas in introduced to a lower section of the tank below the surface of the liquefied gas in the tank, and during a first phase of the filling procedure while gas in introduced to a lower section of the tank the pressure of the tank is maintained below a predetermined set pressure by spraying of liquefied gas into a gas space in the upper section of the tank via a second branch of the fuel feed pipe above the surface of the liquefied gas in the tank, and at a predetermined state of the filling procedure a second phase of the procedure is initiated during which the spraying liquefied gas into a gas space in the upper section of the tank is decreased and the second phase is practiced until a predetermined filling stage of the tank is reached.

7. Method according to claim 6, wherein at the end of the second phase the gas pressure is at a level required by a gas utilizing engine connected to the tank.

8. Method according to claim 6, wherein after a predetermined stage of the filling procedure the controlling of the spraying of liquefied gas into a gas space in the upper section of the tank is practiced so that a second predetermined set pressure is set which corresponds to required gas feed pressure of the engines in the vessel.

9. Method according to claim 6, wherein a portion of the gas brought into the tank during the first phase of the filling procedure is sprayed into a gas space in the upper section of the tank above the surface of the liquefied gas in the tank.

10. Method according to claim 6, wherein during the first phase the portion of the gas sprayed into a gas space in the upper section of the tank is set to be a constant portion of the gas introduced into the tank.

11. Method according to claim 6, wherein during the first phase the rate of spraying of liquefied gas into a gas space in the upper section of the tank is controlled so that the actual gas pressure in the tank has decreasing tendency until the predetermined state of the filling procedure.

12. Method according to claim 6, wherein during the filling process liquefied gas sprayed into a gas space in the upper section of the tank above the surface of the liquefied gas in the tank is recirculated from the lower section of the tank.

13. Method according to claim 6, wherein the rate of spraying of liquefied gas into a gas space in the upper section of the tank above is controlled based on the difference between the actual gas pressure in the tank and the predetermined set pressure.

14. Method according to claim 6, wherein during the second phase the rate of the spraying liquefied gas into a gas space in the upper section of the tank is totally stopped.

15. Method according to claim 6, wherein the predetermined state is defined so that the duration of the second phase is minimized.

16. Liquefied gas fuel system for a gas operated engine, comprising:
   a fuel tank which is in connection with at least one gas operated engine,
   a main evaporator in a fuel conduit leading from the fuel tank to the engine,
   a pressure build up evaporator arranged in a conduit leading from the bottom section of the tank to the upper section of the tank,
   a control unit arranged to exercise a method of starting gas delivery from a liquefied gas fuel system to a gas operated engine in which a fuel tank is filled with liquefied gas, wherein
   the engine is started and operated by gaseous gas and produces waste heat,
   the waste heat produced by the engine is utilized in a heat transfer medium circuit, in which heat transfer medium is flowing through the main evaporator,
   pressure in the fuel tank is controlled by controlling the operation of a pressure build up system comprising the pressure build up evaporator which is arranged in a conduit leading from the bottom section of the fuel tank to the upper section of the fuel tank,
   the heat transfer medium by means of which the waste heat produced by the engine is utilized, flowing through a pressure build up evaporator and the main evaporator being successively connected in series,
   the filling procedure results in the pressure in the tank being at least at an operational pressure required by the engine, and after the filling procedure the pressure build up system being controlled by controlling the flow rate of the evaporated gas in the conduit while the heat transfer medium is allowed to flow unconstrained through the pressure build up evaporator.

* * * * *